Jan. 27, 1931.    J. ASPER    1,790,569

SLIDE RULE

Filed June 14, 1929

JEAN ASPER
INVENTOR

BY Victor J. Evans
ATTORNEY

Patented Jan. 27, 1931

1,790,569

UNITED STATES PATENT OFFICE

JEAN ASPER, OF HAZLETON, PENNSYLVANIA

SLIDE RULE

Application filed June 14, 1929. Serial No. 370,890.

My present invention relates to computing apparatus and more particularly to a slide rule.

An object is the provision of a computing apparatus of this character in which the rule proper is of such construction as to exert a frictional contact with the slide rule to hold the said slide from accidental or free movement with respect to the main rule.
A still further object is the provision of a rule for this purpose in which the rule is centrally formed with a longitudinal slot that communicates with the groove in which the slide rule is received and in which the said main rule at the ends of the slot has fixed on its base the ends of slightly arched plates which not only serve as rests for the rule but which tend to slightly bend the same inwardly from the center thereof to cause a tight frictional engagement between the walls of the groove in the rule proper and the slide rule which is received in said groove and consequently prevent the free or accidental movement of the slide rule.
A still further object is the provision of a calculating slide rule that has arranged thereon a transparent member which will facilitate the reading of scales on the main and slide rules and which is provided with spring means to exert a frictional contact with the main rule to hold the said slide from accidental and free movement on said rule.

To the attainment of the foregoing and other objects which will present themselves, the improvement further resides in certain other novel features of construction, combination and operative association of parts, one satisfactory embodiment of which is disclosed by the accompanying drawings.
In the drawings.

Figure 5:
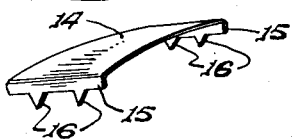

Figure 5 is a perspective view of the slightly arched spring plate that provides a rest for the rule.

Figure 1:
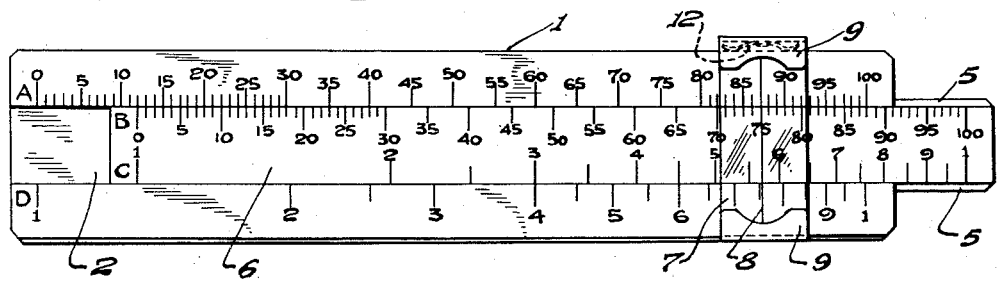
Figure 1 is a front elevation of a calculating slide rule in accordance with this invention.
Figure 2:
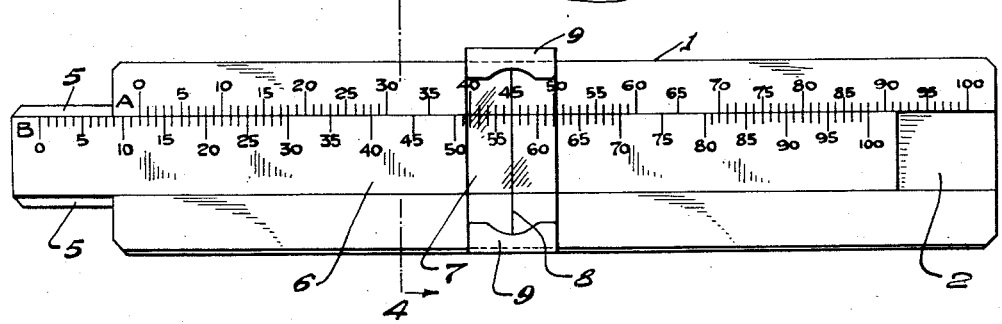
Figure 2 is a view showing the runner in a different position.
Figure 3:
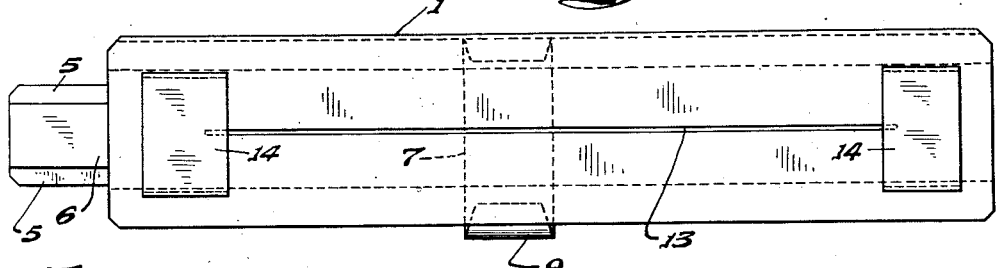
Figure 3 is a rear elevation thereof.
Figure 6:
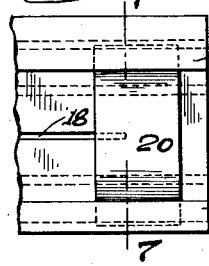
Figure 4:
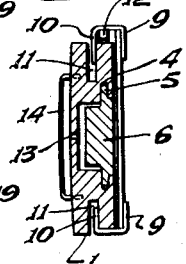
Figure 4 is a sectional view approximately on the line 4—4 of Figure 2.

Figure 6 is a fragmentary rear elevation looking toward the rear face of a slight modification.

The main or fixed rule is indicated in the drawings by the numeral 1. This rule has its outer face centrally formed with a continuous recess 2 that extends the entire length thereof. The upper and lower walls provided by the recess 2 are formed with continuous grooves 4 and in these grooves 4 there are received the tongues 5 on the opposite edges of the slide 6 which is received in the recess 2.

The rule is provided with four graduated scales, the one above the slide 6 being indicated by the letter A in the drawings, another on the upper part of the slide is indicated by the letter B, and both the scales A and B are identical and are to be used in addition and subtraction calculation. The lower part of the slide is provided with logarithmetic scale graduations which are referred to by the character C and which correspond with an identical scale upon the lower part of the fixed rule, the said scale being indicated by the character D. The scales C and D are used in calculations involving multiplications and divisions but as these scales are employed upon other calculating slide rules I make no claim thereto nor to the use to which the same are being devoted.

The slide is provided with a transparent runner which is used to facilitate the reading of the result, especially when more than two factors are involved, or in connection with successive additions or subtractions. The transparent face of the plate member is indicated by the numeral 7 and this face has inscribed thereon a central line 8. The transparent plate 7 has its ends adhesively secured to the outer flanges of substantially cross sectional U-shaped spring metal clips 9, respectively. The inner flanges 10 of these clips 9 are received in longitudinally arranged grooves 11 which extend the entire length and which are arranged at the top and bottom edges of the main or stationary rule 1.

Figure 7:
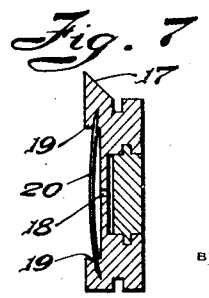

Within either or both of the clips 9 of the runners there is arranged the central and arched portion of a spring 12, and the ends of this spring exert a pressure against the edge of the fixed rule and thereby hold the said runner from accidental movement on the rule. The back of the rule, in a line with the center of the recess 2, is formed with a longitudinal slot 13 which terminates adjacent to the ends of the said rule member 1. This slot 13, it is to be noted, enters the thinnest portion of the rule member 1, but on the back of the said rule member 1, adjacent to the ends thereof there are fixed rest plates. These rest plates are of spring metal and as disclosed by Figure 5 of the drawings are initially slightly arched. Each of the rest plates 14 has its ends flanged in the same direction, as at 15, and these flanges are formed with prongs 16 that are designed to be inserted in the back of the rule section 1. The slightly arched spring rest plates 14 therefore exert an inward pressure against the portions of the rule section 1 on the opposite sides of the slot 13 therein, so that the said rule section 1 will yield sufficiently to tightly compress the tongues 5 of the slide 6 in the grooves 4 provided therefor. In Figures 6 and 7 I have illustrated a slight modification. One of the main features of which being the beveled edge 17 formed outwardly of one of the grooves for the flange 10 of the runner and this edge may have arranged thereon a scale. Another feature is that the back of the main section of the rule in addition to being provided with the central and longitudinally extending slot 18 is formed with a depression on its outer or rear face, and inserted in the longitudinal and parallel walls 19 provided by this depression there are the pronged or pointed ends of arched plates 20, the said plates serving the same purpose as the arched rest plates 14 that is, to force the tongues of the slide into tight frictional engagement with the walls provided by the grooves in the main rule.

Having described the invention, I claim:

A slide rule comprising a main rule having one face provided with a comparatively wide and deep groove extending the full length of the rule and communicating with a slot formed in the rule and extending adjacent to each end thereof, to permit the rule to flex, a slide member in the groove, the walls of said groove having grooves, tongues on the slide member and fitting in said last named grooves, and curved tension plates having teeth biting into the main rule and at opposite sides of the slot and adjacent the ends of the rule to flex the latter and bind the tongues in the grooves to prevent accidental displacement of the slide member relative to the main rule.

In testimony whereof I affix my signature.

JEAN ASPER.